United States Patent
Tsai

(10) Patent No.: US 9,272,848 B2
(45) Date of Patent: Mar. 1, 2016

(54) CARRYING DEVICE AND CONTROLLING METHOD

(71) Applicant: HON HAI PRECISION INDUSTRY CO., LTD., New Taipei (TW)

(72) Inventor: Hsueh-Tsen Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 131 days.

(21) Appl. No.: 14/192,884

(22) Filed: Feb. 28, 2014

(65) Prior Publication Data

US 2015/0025676 A1    Jan. 22, 2015

(30) Foreign Application Priority Data

Jul. 17, 2013   (CN) .......................... 2013 1 0300155

(51) Int. Cl.
*G06F 7/00* (2006.01)
*B65G 43/00* (2006.01)
*B65G 1/07* (2006.01)

(52) U.S. Cl.
CPC . *B65G 43/00* (2013.01); *B65G 1/07* (2013.01)

(58) Field of Classification Search
None
See application file for complete search history.

(56) References Cited

U.S. PATENT DOCUMENTS

| 2005/0036858 A1* | 2/2005 | Ueda ................... B65G 1/0435 414/280 |
| 2010/0162694 A1* | 7/2010 | Angleitner ............. B65G 61/00 60/327 |
| 2012/0306626 A1* | 12/2012 | Abe .................... B65G 1/0421 340/10.4 |

\* cited by examiner

*Primary Examiner* — Yolanda Cumbess
(74) *Attorney, Agent, or Firm* — Novak Druce Connolly Bove + Quigg LLP

(57) ABSTRACT

A carrying device includes a rack and a platform. The platform that loads goods, is moveably arranged on a handle of the rack. The carrying device further includes a sensor that detects the goods loaded on the platform, a motor that is connected to the platform, and a controlling unit that controls the motor drive the platform to move relative to the handle with a predetermined distance, according to whether the sensor detects the goods loaded on the platform.

18 Claims, 5 Drawing Sheets

CARRYING DEVICE AND CONTROLLING METHOD

BACKGROUND

1. Technical Field

Embodiments of the present disclosure relate to a device control technology, and more particularly, to a carrying device and a method of controlling a movement direction of the carrying device.

2. Description of Related Art

A carrying device, such as a cart, can be used to load goods. A typical carrying device has a platform capable of moving upwards and downwards for facilitating loading goods placed thereon. However, the upwards and downwards movement of the platform is usually implemented by manual operations, which is not convenient. Therefore, there is room for improving the control of the carrying device.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device.

Figure 1:
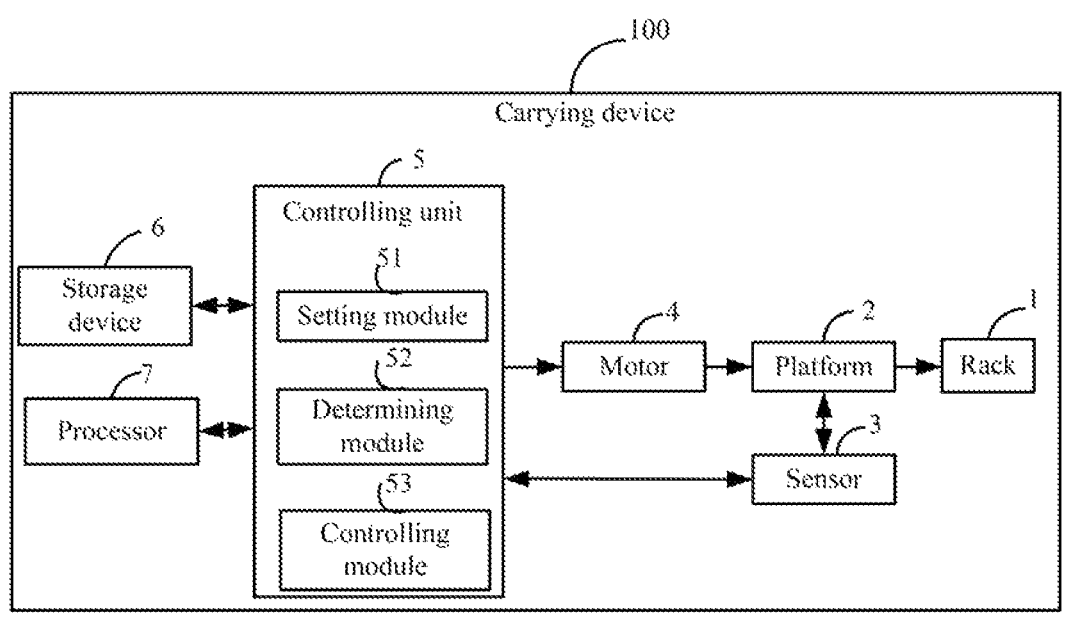
FIG. 1 is a block diagram of one embodiment of an inner structure of a carrying device.
Figure 2:
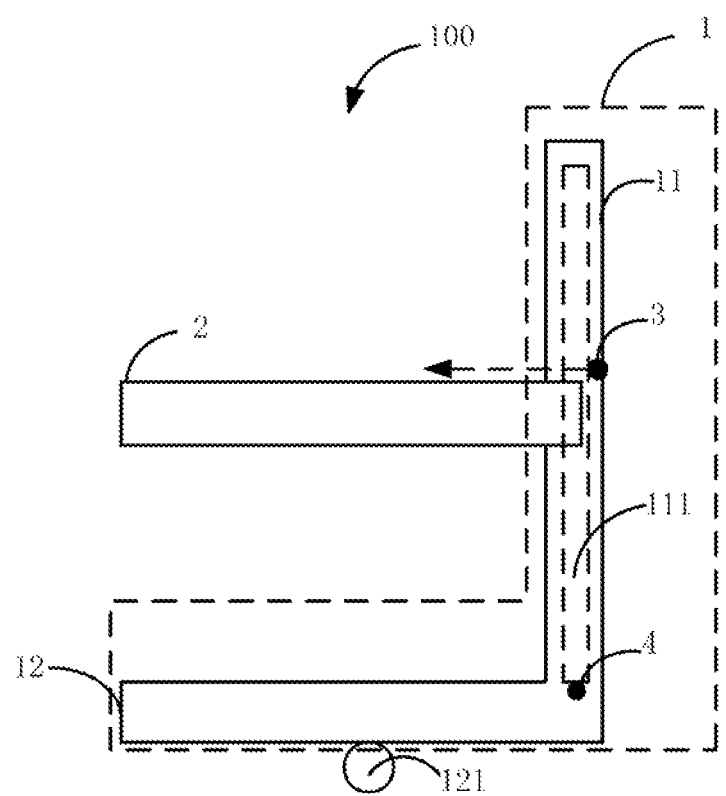
FIG. 2 illustrates an example of an external structure of the carrying device of FIG. 1.

FIG. 1 is a block diagram of one embodiment of a carrying device 100 including a controlling unit 5, and FIG. 2 illustrates a structure diagram of one embodiment of the carrying device 100 of FIG. 1. The carrying device 100 includes a rack 1 and a platform 2. The platform 2 is moveably arranged on the rack 1 and can be used to load goods. In one embodiment, the rack 1 includes a handle 11, and a support 12 to support the handle 11 and the platform 2. The carrying device 100 is moveable by pushing or pulling the handle 11. For facilitating moving the carrying device 100, one or more wheels 121 are mounted on the support 12.

In this embodiment, the platform 2 is moveably fastened on a rail 111, which is arranged on the handle 11. The rail 111 extends from a top end of the handle 11 to a bottom end of the handle 11.

In this embodiment, the carrying device 100 further includes a sensor 3, a motor 4, a storage device 6, and at least one processor 7. The sensor 3 is adjustable fixed on the handle 11 and located above and near the platform 2, and is used to detect the goods loaded on the platform 2. For example, the sensor 3 is adjustable fixed on the handle 11 by a magic tape.

In one embodiment, the sensor 3 is an infrared sensor. The sensor 3 detects the goods loaded on the platform 2 by emitting infrared light towards a horizontal direction (e.g., horizontal-left as shown in FIG. 2) of the platform 2, and receives infrared light reflected by the goods loaded on the platform 2. That is, the sensor 3 detects the goods loaded on the platform 2 according to the reflected infrared light.

For example, if the sensor 3 fails to receive any reflected infrared light, the sensor 3 determines that no goods is loaded on the platform 2. If the sensor 3 receives the reflected infrared light, the sensor 3 determines that the goods loaded on the platform 2 is detected.

In this embodiment, the motor 4 is arranged on the bottom end of the handle 11, and is connected to the platform 2 using a transport belt (not indicated in FIG. 1 and FIG. 2).

It should be noted that, the default position of the platform 2 on the handle 11 can be preset according to user requirements, by adjusting the transport belt between the platform 2 and the motor 4. For example, as shown in FIG. 2, the user sets the default position of the platform 2 to be a half height of the handle 11, which is suitable for the user to load goods on the platform 2 or unload goods from the platform 2.

The controlling unit 5 is in connection to the sensor 3 and the motor 4, and is used to control a movement direction of the platform 2. In one embodiment, the movement direction of the platform 2 includes a first direction that towards downwards relative to the handle 11, and a second direction that towards upwards relative to the handle 11.

In one embodiment, the controlling unit 5 controls the movement direction of the platform 2 by controlling the motor 4 to drive the platform 2, to move towards downwards or upwards relative to the handle 11, according to a detection result obtained from the sensor 3. Details will be given in the following.

In this embodiment, the controlling unit 5 may include a setting module 51, a determining module 52, and a controlling module 53. The modules 51-53 include computerized codes in the form of one or more programs that may be stored in the storage device 6. The computerized code includes instructions that are executed by the at least one processor 7.

Figure 3:
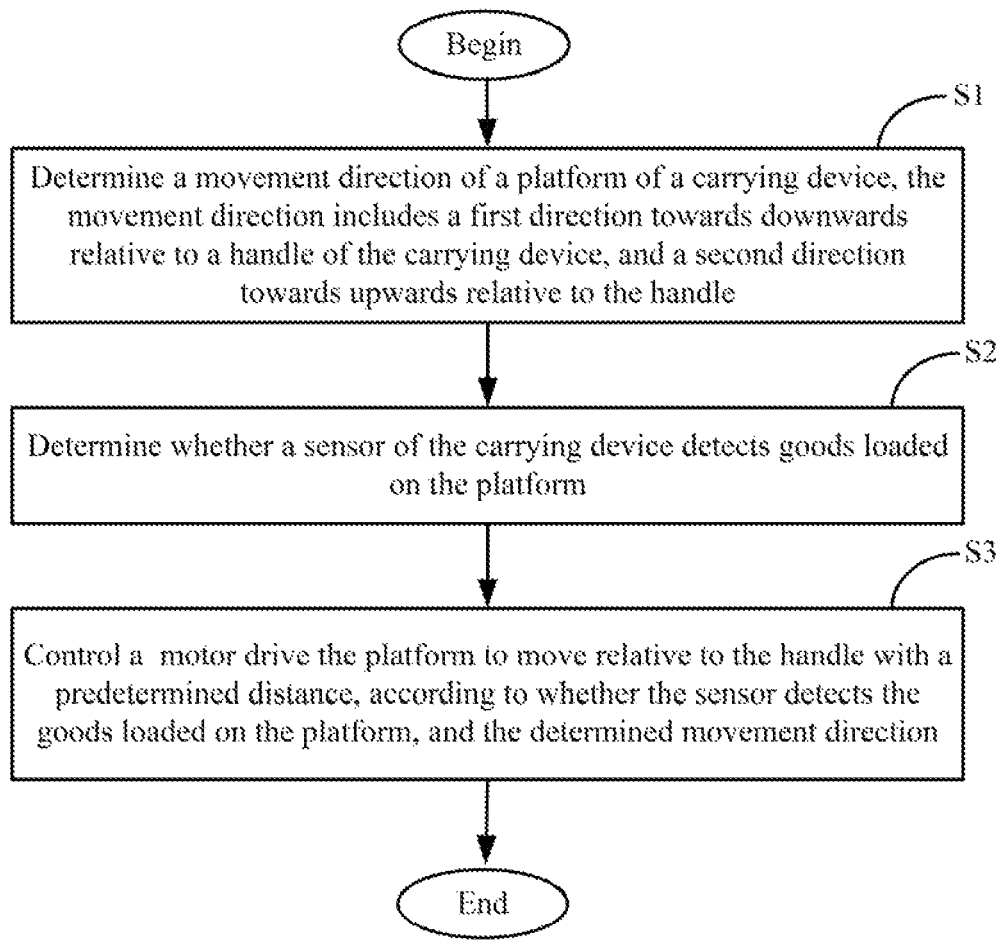
FIG. 3 illustrates a flowchart of one embodiment of a method for controlling a direction movement of a platform of the carrying device shown in FIG. 1 and FIG. 2.

FIG. 3 illustrates a flowchart of one embodiment of a method for controlling the movement direction of the platform 2 of the carrying device 100 shown in FIG. 1 and FIG. 2. Depending on the embodiment, additional steps in FIG. 3 may be added, others removed, and the ordering of the steps may be changed.

In step S1, the setting module 51 determines the movement direction of the platform 2. In one embodiment, the movement direction of the platform 2 includes the first direction towards downwards relative to the handle 11, and the second direction towards upwards relative to the handle 11.

In this embodiment, for facilitating the user using the carrying device 100, the setting module 51 displays a selecting menu (e.g., a drop-down menu) on a display of the carrying device 100. The selecting menu lists the first and the second directions for the user to choose. Then the setting module 51 determines the movement direction of the platform 2 according to the user's choice.

Figures 4A, 4B, 4C:
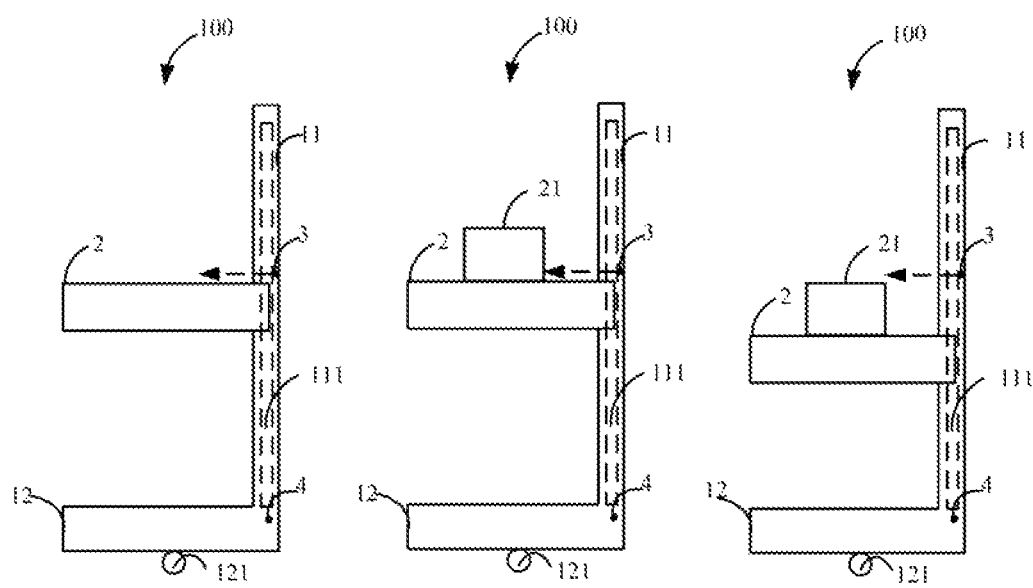
FIG. 4A-FIG. 4C illustrate an example of loading goods on the platform of the carrying device shown in FIG. 1 and FIG. 2.

For example, as shown in FIG. 4A, the current position of the platform 2 (e.g. the platform 2 locates at the half height of the handle 11) is suitable for the user to load goods on the platform 2. When the user loads first goods (e.g., a container 21 as shown in FIG. 4B) on the platform 2, it is conveniently for the user to load next goods on the platform 2, if the platform 2 moves downwards relative to the handle 11 as shown in FIG. 4C. Then the user can select the first direction from the selecting menu, and the setting module 51 determines that the movement direction of the platform 2 is the first direction.

Figures 5A, 5B, 5C:
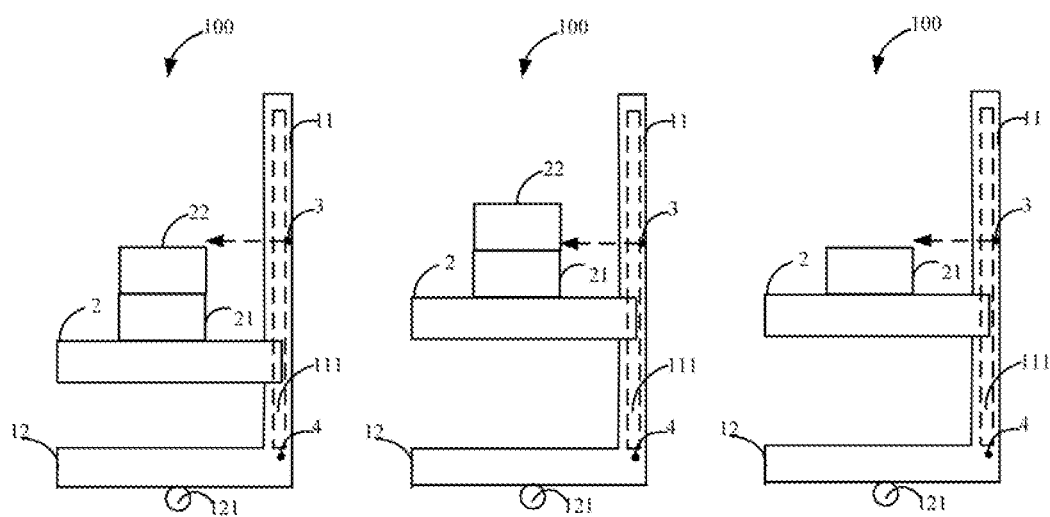
FIG. 5A-FIG. 5C illustrate an example of unloading goods from the platform of the carrying device shown in FIG. 1 and FIG. 2.

In another example, as shown in FIG. 5A, goods (e.g., the container 21 and a container 22) are loaded on the platform 2. When the user needs to unload the goods from the platform 2, the platform 2 is controlled to move upwards relative to the handle 11, and it is conveniently for the user to unload the container 22 from the platform 2 as shown in FIG. 5B. Then the user can select the second direction from the selecting menu, and the setting module 51 determines that the movement direction of the platform 2 is the second direction.

In step S2, the determining module 52 determines whether the sensor 3 detects any goods loaded on the platform 2, and acquires a detection result.

In one embodiment, the sensor 3 is the infrared sensor. The sensor 3 emits infrared light towards the horizontal direction (e.g., the horizontal-left as shown in FIG. 2) of the platform 2, and receives infrared light reflected by the goods loaded on the platform 2. In this embodiment, the determining module 52 determines that the sensor 3 detects the goods when the sensor 3 receives the infrared light reflected by the goods loaded on the platform 2.

For example, as shown in FIG. 4A and FIG. 5A, when the sensor 3 emits infrared light towards the horizontal-left of the platform 2, as the infrared light is not reflected by any goods loaded on the platform 2, the sensor 3 fails to receive any reflected infrared light, then the determining module 52 determines that the sensor 3 does not detect the goods.

In another example, as shown in FIG. 4B and FIG. 5B, when the sensor 3 emits infrared light towards the horizontal-left of the platform 2, as the infrared light is reflected by the container 21 in FIG. 4B, and reflected by the container 22 in FIG. 5B, the sensor 3 receives reflected infrared light, then the determining module 52 determines that the sensor 3 detects the goods.

In step S3, the controlling module 53 controls the motor 4 drive the platform 2 to move relative to the handle 11 with a predetermined distance, according to the detection result acquired in step S2, and the movement direction determined in step S1. In one embodiment, the predetermined distance is equal to a height of the goods (e.g., the container 21) loaded on the platform 2.

In this embodiment, the controlling module 53 controls the motor 4 drive the platform 2 to move downwards relative to the handle 11 with the predetermined distance, when the sensor 3 detects the goods and the movement direction of the platform 2 is determined to be the first direction.

In other embodiments, the controlling module 53 controls the motor 4 drive the platform 2 to move upwards relative to the handle 11 with the predetermined distance, when the sensor 3 does not detect any goods and the movement direction of the platform 11 is determined to be the second direction.

For example, as shown in FIG. 4A, before the user loads goods (e.g., the container 21) on the platform 2, the sensor 3 fails to receive any reflected infrared light. Once the user loads the container 21 on the platform 2 as shown in FIG. 4B, the sensor 3 receives the reflected infrared light. When the movement direction of the platform 2 is determined to be the first direction, the controlling module 53 controls the motor 4 drive the platform 2 to move downwards relative to the handle 11 with the predetermined distance, to facilitate the user to load other goods on the platform 2 as shown in FIG. 4C.

In another example, as shown in FIG. 5A, before the user unloads the container 22 from the platform 2, the sensor 3 fails to receive any reflected infrared light. When the movement direction of the platform 2 is determined to be the second direction, the controlling module 53 controls the motor 4 drive the platform 2 to move upwards relative to the handle 11 with the predetermined distance as shown in FIG. 5B.

When the user unloads the container 22 from the platform 2, as shown in FIG. 5C, the sensor 3 cannot receive any reflected infrared light, then the controlling module 53 controls the motor 4 drive the platform 2 to move upwards relative to the handle 11 with the predetermined distance, to facilitate the user to unload the container 21 from the platform 2.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A carrying device, comprising:
   a rack that comprises a handle;
   a platform moveably arranged on the handle for loading goods;
   a sensor;
   a motor that is connected to the platform;
   at least one processor; and
   a storage device storing a plurality of instructions, which when executed by the at least one processor, causes the at least one processor to:
   determine a movement direction of the platform, the movement direction comprising a first direction towards downwards relative to the handle, and a second direction towards upwards relative to the handle;
   determine whether the sensor detects the goods loaded on the platform; and
   control the motor to drive the platform to move downwards relative to the handle with a predetermined distance, when the sensor detects the goods and the movement direction of the platform is determined to be the first direction; or
   control the motor to drive the platform to move upwards relative to the handle with the predetermined distance, when the sensor does not detect the goods and the movement direction of the platform is determined to be the second direction.

2. The carrying device of claim 1, wherein a rail is arranged on the handle, the rail is extended from a top end of the handle to a bottom end of the handle, and the platform is moveably fastened on the rail.

3. The carrying device of claim 1, wherein the sensor is adjustably fixed on the handle and located above and near the platform.

4. The carrying device of claim 3, wherein the sensor is an infrared sensor, and the processor determines that the goods are detected by the sensor when the sensor receives reflected infrared light from the goods loaded on the platform.

5. The carrying device of claim 1, wherein the rack further comprises a support which supports the handle and the platform.

6. The carrying device of claim 5, wherein the rack further comprises one or more wheels which are mounted on the support.

7. A method for controlling a carrying device, the carrying device comprising a rack that comprises a handle, a platform that loads goods, is moveably arranged on the handle, a sensor that detects the goods loaded on the platform, a motor that is connected to the platform, and a processor, the method comprising:
    determining a movement direction of the platform, the movement direction comprising a first direction towards downwards relative to the handle, and a second direction towards upwards relative to the handle;
    determining whether the sensor detects the goods loaded on the platform; and
    controlling the motor to drive the platform to move downwards relative to the handle with a predetermined distance, when the sensor detects the goods and the movement direction of the platform is determined to be the first direction; or
    controlling the motor to drive of the platform to move upwards relative to the handle with the predetermined distance, when the sensor does not detect the goods and the movement direction of the platform is determined to be the second direction.

8. The method of claim 7, wherein a rail is arranged on the handle, the rail is extended from a top end of the handle to a bottom end of the handle, and the platform is moveably fastened on the rail.

9. The method of claim 7, wherein the sensor is adjustably fixed on the handle and located above and near the platform.

10. The method of claim 9, wherein the sensor is an infrared sensor, and the goods are detected by the sensor when the sensor receives reflected infrared light from the goods loaded on the platform.

11. The method of claim 7, wherein the rack further comprises a support which supports the handle and the platform.

12. The method of claim 11, wherein the rack further comprises one or more wheels which are mounted on the support.

13. A non-transitory storage medium having stored thereon instructions that, when executed by a processor of a carrying device, causes the processor to perform a controlling method in the carrying device, the carrying device comprising a rack that comprises a handle, a platform moveably arranged on the handle for loading goods, a sensor that detects the goods loaded on the platform, and a motor that is connected to the platform, wherein the method comprises:
    determining a movement direction of the platform, the movement direction comprising a first direction towards downwards relative to the handle, and a second direction towards upwards relative to the handle;
    determining whether the sensor detects the goods loaded on the platform; and
    controlling the motor to drive of the platform to move downwards relative to the handle with a predetermined distance, when the sensor detects the goods and the movement direction of the platform is determined to be the first direction; or
    controlling the motor to drive the platform to move upwards relative to the handle with the predetermined distance, when the sensor does not detect the goods and the movement direction of the platform is determined to be the second direction.

14. The non-transitory storage medium of claim 13, wherein a rail is arranged on the handle, the rail is extended from a top end of the handle to a bottom end of the handle, and the platform is moveably fastened on the rail.

15. The non-transitory storage medium of claim 13, wherein the sensor is adjustably fixed on the handle and located above and near the platform.

16. The non-transitory storage medium of claim 15, wherein the sensor is an infrared sensor, and the goods are detected by the sensor when the sensor receives reflected infrared light from the goods loaded on the platform.

17. The non-transitory storage medium of claim 13, wherein the rack further comprises a support which supports the handle and the platform.

18. The non-transitory storage medium of claim 17, wherein the rack further comprises one or more wheels which are mounted on the support.

* * * * *